United States Patent [19]

Klingler

[11] Patent Number: 5,638,722
[45] Date of Patent: Jun. 17, 1997

[54] ADJUSTMENT DEVICE IN A SEAT FOR A PELVIS AND/OR LORDOSIS SUPPORT IN A BACK SUPPORT CONNECTABLE TO THE SEAT, WITH A BOWDEN-CABLE ARRANGEMENT CONNECTED THERETO

[75] Inventor: Knud Klingler, Nürnberg, Germany

[73] Assignee: AMEU Management Corp., Panama, Panama

[21] Appl. No.: 436,363

[22] PCT Filed: Jun. 16, 1994

[86] PCT No.: PCT/EP94/01964

§ 371 Date: Jun. 29, 1995

§ 102(e) Date: Jun. 29, 1995

[87] PCT Pub. No.: WO95/01115

PCT Pub. Date: Jan. 12, 1995

[30] Foreign Application Priority Data

Jul. 1, 1993 [DE] Germany .................. 43 21 985.3

[51] Int. Cl.$^6$ .................... F16C 1/10; F16C 1/12
[52] U.S. Cl. ............ 74/502.4; 74/502.6; 74/500.5; 74/501.5 R; 74/501.6; 74/523; 297/374
[58] Field of Search ............... 74/526, 527, 523, 74/528, 500.5, 501.5 R, 502.4, 502.6, 502, 501.6; 297/374, 86, 87

[56] References Cited

U.S. PATENT DOCUMENTS

| 2,335,000 | 11/1943 | Edwards | 24/201 |
|---|---|---|---|
| 3,247,562 | 4/1966 | Davies | 24/123 |
| 4,850,084 | 7/1989 | Iwasaki | 74/502.4 X |
| 5,010,780 | 4/1991 | Hatfield | 74/501.5 R |
| 5,039,138 | 8/1991 | Dickirson | 74/502.6 X |
| 5,156,063 | 10/1992 | Kelley | 74/501.5 R |
| 5,259,265 | 11/1993 | Gabas et al. | 74/502.4 |
| 5,277,080 | 1/1994 | Roelle | 74/501.5 R |
| 5,293,785 | 3/1994 | Lichtenberg | 74/500.5 |
| 5,307,707 | 5/1994 | Roelle | 74/502.6 |
| 5,328,242 | 7/1994 | Steffens et al. | 297/374 |
| 5,544,543 | 8/1996 | Hilgert et al. | 74/502.4 |

FOREIGN PATENT DOCUMENTS

| 60-30817 | 2/1985 | Japan | 74/502.4 |
|---|---|---|---|
| 2-159408 | 6/1990 | Japan | 74/502.4 |
| 2-208157 | 8/1990 | Japan | 74/502.4 |
| 2013487 | 8/1979 | United Kingdom . | |

*Primary Examiner*—Vinh T. Luong
*Attorney, Agent, or Firm*—Harness, Dickey & Pierce, P.L.C.

[57] ABSTRACT

An adjustment device is provided for use with a pelvis and/or lordosis support arranged in a back support connectable with a seat. The adjustment device contains an axially movable, threaded spindle (2) guided in a housing (1), a threaded ring (4), and an adjustment handle (3), and the housing (1) and the threaded spindle (2) each have an axial, central bore (6, 7) for passing through the cable line (9) of a Bowden-cable arrangement (10). The bores (6, 7) are aligned with each other, whereby the central bore (6) in the threaded spindle (2) has ha hollow space directed at the adjustment handle (3) for inserting and holding a nipple (14) of the one end of the cable line. Provision is made in the side wall of the housing (1) for a radial opening (11), and in the side wall of the threaded spindle (2) for a cross bore (12) ending within the zone of the holding of the nipple (14). The radial opening (11) and the cross bore (12) are aligned with each other in a mutual position of the housing (1) and the threaded spindle (2), forming a passage with a diameter permitting the nipple (14) to pass through, whereby the opening (11) and the cross bore (12) are each connected with the central bores (6 and 7, respectively) by a slot (15 and 16, respectively) permitting the passage of the cable line (9).

8 Claims, 1 Drawing Sheet

5,638,722

ADJUSTMENT DEVICE IN A SEAT FOR A PELVIS AND/OR LORDOSIS SUPPORT IN A BACK SUPPORT CONNECTABLE TO THE SEAT, WITH A BOWDEN-CABLE ARRANGEMENT CONNECTED THERETO

BACKGROUND OF THE INVENTION

1. Field of the Invention

The invention relates to an adjustment device in a seat for a pelvis and/or lordosis support arranged in a back support connectable with the seat, with a Bowden-cable arrangement connecting the pelvis and/or lordosis support, whereby the adjustment device contains an axially movable, threaded spindle guided in a housing, a threaded ring, and an adjustment handle, and the housing and the threaded spindle each have a central bore for passing through the cable line of the bowden-cable arrangement, said bores being aligned with each other, whereby the central bore in the threaded spindle ends in an interior space for receiving a nipple of one end of the cable line, the interior space being directed at the adjustment handle.

2. Description of the Prior Art

An adjustment device is known from GB-A-2,013,487 and is used in connection with back supports of seats in connection with which the operating handle is arranged also in the back support. However, in many cases, no space is available within the zone of the back support for such manually adjustable operating handles, which for their operation also require free space, so that the operating handle has to be placed in the seat. Since the back support and the seat are, in a modern production, manufactured in different locations, there are problems during the assembly of the back support and seat with passing the one end of the cable line through the operating handle and then locking it, which often has to be accomplished under difficult spatial conditions, which means it requires expenditure in terms of time and cost.

SUMMARY OF THE INVENTION

The object of the present invention is to improve an adjustment device of the type specified above in a way such that the insertion and the end of the cable line and its anchoring in the axially movable, threaded spindle is possible without much assembly expenditure with a completely prefabricated Bowden-cable arrangement.

These and other objects of the present invention are obtained by providing an adjustment device, comprising: an axially movable, threaded spindle guided in a housing; a threaded ring, and an adjustment handle, and the housing and the threaded spindle each have an axial central bore for passing through the cable line of the Bowden-cable arrangement, said bores being aligned with each other, whereby the central bore in the threaded spindle ends in an interior space for receiving the nipple of the one end of the cable line, said interior space being directed at the adjustment handle, characterized in that a radial opening is provided in the side wall of the housing, and a cross bore ending in the zone of mounting support for the nipple is provided in the side wall of the threaded spindle, whereby the radial opening and the cross bore are aligned with each other in a mutual position of the housing and the threaded spindle, forming a common passage permitting the passing through of the nipple, whereby the opening and the cross bore each are connected with the central bore by a slot permitting passage of the cable line, said slots being disposed in a common plane.

BRIEF DESCRIPTION OF THE DRAWINGS

The invention is explained in the following in greater detail on an exemplified embodiment by reference to the schematic drawings, in which.

DETAILED DESCRIPTION OF THE PREFERRED EMBODIMENT

Figure 1:
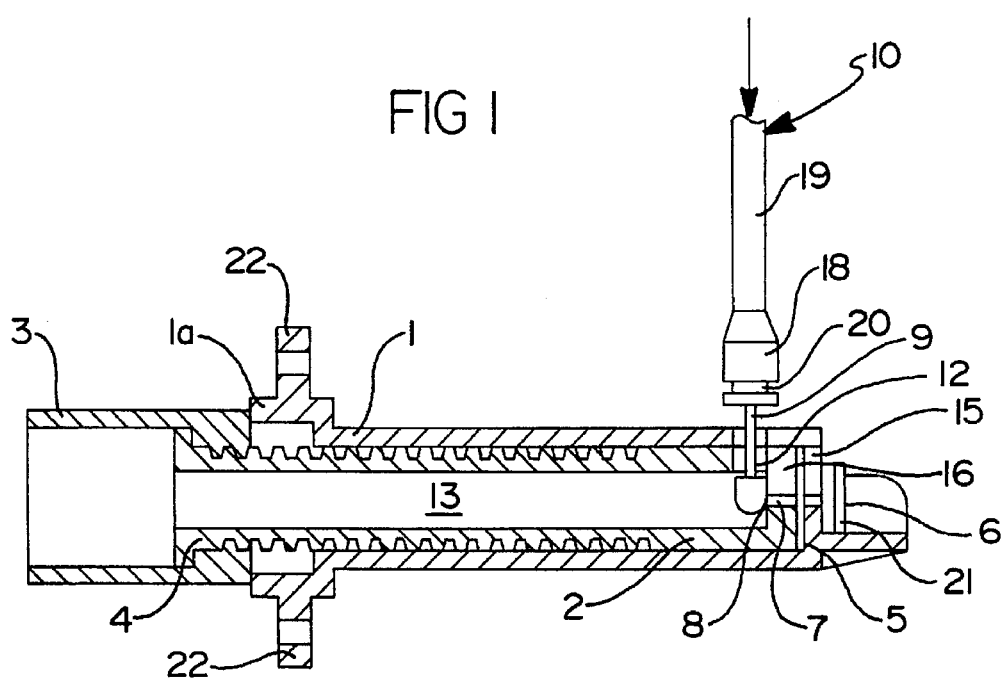
FIG. 1 shows a section through an adjustment device, into which the end of a cable line is inserted, said end being fitted with a nipple.

The adjustment device according to the exemplified embodiment has a two-stage, cylindrical housing 1, in which a threaded spindle 2 is guided axially movable, but with torsional strength on a guide (not shown). An adjustment handle 3 supports itself on the expanded stage 1a of the housing 1, said handle being fitted with a ring 4 with an inside thread engaging the outside thread of the threaded spindle 2. By turning the adjustment handle 3 and thus the threaded ring 4, the threaded spindle 2 is axially moved within the housing 1.

At the end opposite the adjustment handle 3, the housing 1 is sealed by a bottom 5 with a central bore 6. The central bore 6 is aligned with a central bore 7 in the bottom 8 of the threaded spindle 2, the latter preferably being hollow-cylindrical. The bores 6, 7 have a diameter permitting the passage of the cable line 9 of the Bowden-cable arrangement 10. The side wall of the housing 1 has a radially directed opening 11 and the threaded spindle 2 has a cross bore 12, said opening and said bore being aligned in the position shown in FIG. 1, where the threaded spindle 2 is completely pushed into the housing 1 and the bottom 5 of spindle 2 and the bottom, 8 of housing 1 abut each other, forming a common passage that creates a connection from the outside into the interior space 13 of the threaded spindle 2. The opening 11 and the cross bore 12 have the same diameters, which permits inserting the nipple 14—which is mounted on one end of the cable line 9—in the interior space 13 in the threaded spindle 2, as shown in FIG. 1.

Starting from the opening 11 and the cross bore 12, provision is made for the slots 15 and 16, respectively, in the housing I and, respectively, in the threaded spindle 2, said slots ending in the central bores 6 and 7, respectively. The two slots 15 and 16 are disposed in one plane and aligned with each other. The width of the slots 15 and 16 is selected in a way such that the cable line 9 can be swiveled with little play from the position shown in FIG. 1 into the position shown in FIG. 2, where the cable line 9 rests in the central bores 6 and 7.

Within the zone of its central bore 6, the housing 1 has, on the outside, a partly cylindrical projection 17, in which the reinforced end 18 of the sleeve 19 of the Bowden-cable arrangement 10 can be inserted, Preferably, the reinforced end 18 has an annular groove 20, serving as a lock for a partly ring-shaped bolt 21 provided within the partly cylindrical projection 17, and fixing the end of the Bowden-cable sleeve 19 on the housing 1 in an axially unmovable way. The free ends of the partly cylindrical projection 17, said ends opposing each other, have a side wall opening matching the shape of the reinforced end 18, so that the partly cylindrical projection 17 has a rounded U-shaped cross section. Preferably, the free lateral edges of the side wall opening can be elastic in a way such that the reinforced end 18 can be laterally inserted under pressure in the partly cylindrical projection 17 in the way of a snap connection, which prevents that the reinforced end 18 slides out during the assembly, and assures its central arrangement, ensuring smooth passage of the cable line 9 into the housing 1.

Figure 2:
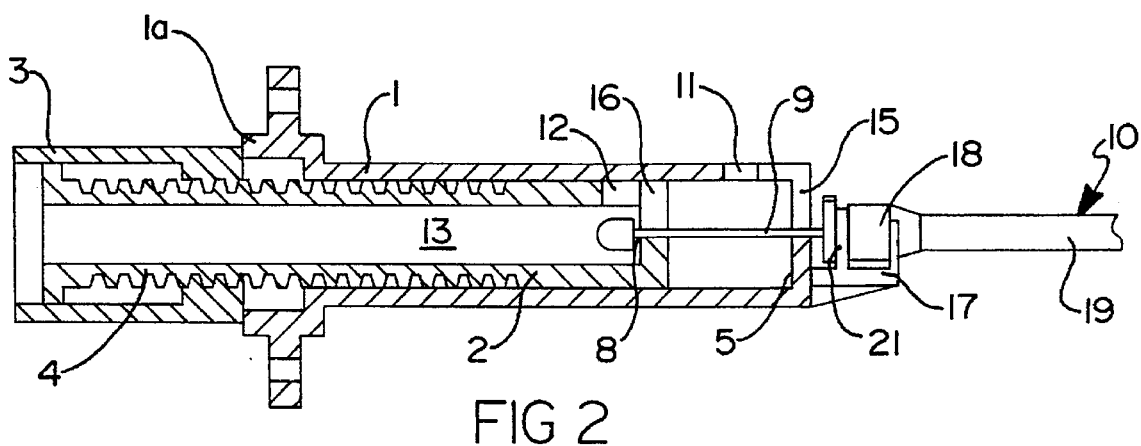
FIG. 2 shows the same adjustment device as in FIG. 1, whereby the nipple and the end of the cable line are in an operating position.
Figure 3:
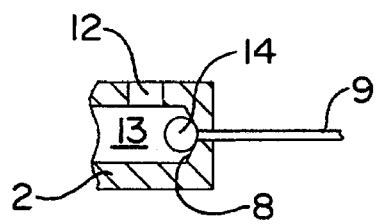
FIG. 3 shows a cutout of the threaded spindle with a variation of the support for a nipple of the end of the cable line.

In the exemplified embodiment shown in FIGS. 1 and 2, the radial opening 11 and the cross bore 12 are designed in a way such that in their aligned positions, they end directly on the bottom 8 in the interior space 13 of the threaded spindle 2, said bottom having the central bore 7. However, it is possible also to displace the cross bore 12 by a few millimeters (see FIG. 3) in the direction of the adjustment handle 3, because this assures a more forcefully closed holding, a deepening for the inserted nipple 14, which practically excludes any sliding out of the nipple 14 due to distortion of the cable line 9 during the assembly.

As shown in FIGS. 1 and 2, the nipple 14 can have a straight, but also a round, rounded (FIG. 3) or conical bearing surface. Also, it can have multi-edged side surfaces and/or also bearing surfaces capable of cooperating with matching shapes provided in the bottom 8 and/or in the adjacent side walls of the threaded spindle 2.

The adjustment device has to be assembled as follows: The adjustment device is mounted on a seat by means of the flanges 22 provided on the stage 1a of the housing. Following the assembly of the seat and the back support, the end of the cable line 9 supporting the nipple 14, said line being the cable line of the Bowden-cable arrangement 10 that is extended from the back support, is slightly pulled out of the Bowden-cable sleeve 19, and inserted through the bore 11 in the housing 1 and through the cross bore 12 in the threaded spindle 2 in the interior space 13 of the latter (see FIG. 1). Now, the cable line 9 with the reinforced end 18 of the Bowden-cable sleeve 19 is swiveled by about 90 degrees to an extent such that the cable line 9, the latter sliding through the slots 15 and 16, is received in the central bores 6 and 7, and the reinforced end 18 of the Bowden-cable sleeve 19 snaps into the partly cylindrical projection 17 in a way such that the bolt 21 engages the annular groove 20. This permits the assembly in a simple and rapid way without additional tools. By turning the adjustment handle 3, the threaded spindle 2 can be axially moved within the housing 1 (see also the position in FIG. 2) and, in this way, adjust also the part that is connected with the other end of the Bowden-cable arrangement, which part, for example may be an arching element in the back support, whose curvature or position of height is to be adjusted.

I claim:

1. An adjustment device, comprising:

a housing having a radial opening in a sidewall thereof;

an axially movable threaded spindle supported in said housing, said threaded spindle having a cross bore in a sidewall thereof;

an adjustment handle attached to a threaded ring which engages said threaded spindle;

wherein said housing and said threaded spindle each have an axial central bore for receiving a cable of a Bowden-cable arrangement, said central bores being aligned with each other, the central bore in said threaded spindle ends in an interior space of said spindle for receiving a nipple attached to one end of said cable, said radial opening and said cross bore being aligned with each other in a mutual position of the housing and the threaded spindle forming a common passage permitting insertion of said nipple into said interior space, said radial opening being connected with said central bore of said housing by a first slot and said cross bore being connected with said central bore of said threaded spindle by a second slot, said first and second slots being disposed in a common plane for permitting passage of said cable.

2. The adjustment device according to claim 1, wherein said housing has an axial, at least partly cylindrical projection for receiving an end of a sleeve of the Bowden-cable, said projection being directed at the Bowden-cable sleeve.

3. The adjustment device according to claim 2, wherein said end of the Bowden-cable sleeve has a cylindrical reinforcement with a lock, and the partly cylindrical projection has a bolt inserted in the lock.

4. The adjustment device according to claim 2 wherein said partly cylindrical projection is connected with the Bowden-cable sleeve by a snap connection.

5. The adjustment device according to claim 1 wherein said cross bore ends with a spacing from a bottom of the threaded spindle at least conforming to a total length of the nipple.

6. An adjustment device, comprising:

a housing having a radial opening in a sidewall thereof;

an axially movable spindle supported by said housing, said spindle having a cross bore in a sidewall thereof;

an adjustment handle in a drivingly connected with said axially movable spindle for infinitely adjusting the axial position of said spindle relative to said housing;

wherein said housing and said spindle each have an axial central bore for receiving a cable of a Bowden-cable arrangement, said central bores being aligned with each other, the central bore in said spindle ends in an interior space of said spindle for receiving a nipple attached to one end of said cable, said radial opening and said cross bore being aligned with each other in a mutual position of the housing and the spindle forming a common passage permitting insertion of said nipple into said interior space, said radial opening being connected with said central bore of said housing by a first slot and said cross bore being connected with said central bore of said spindle by a second slot, said first and second slots being disposed in a common plane for permitting passage of said cable.

7. An adjustment device, comprising:

a housing;

an axially movable spindle supported in said housing, said spindle having a cross bore in a sidewall thereof;

an adjustment handle drivingly connected with said axially movable spindle for infinitely adjusting the axial position of said spindle relative to said housing;

wherein said spindle has an axial central bore for receiving a cable of a Bowden-cable arrangement, wherein the central bore ends in an interior space of said spindle for receiving a nipple attached to one end of said cable, said cross bore forming a passage for permitting insertion of said nipple into said interior space, said cross bore being connected with said central bore of said spindle by a slot for permitting passage of said cable.

8. An adjustment device, comprising:

a housing;

an axially movable threaded spindle supported in said housing, said spindle having a cross bore in a sidewall thereof;

an adjustment handle connected to a threaded ring drivingly connected with said axially movable spindle for infinitely adjusting the axial position of said spindle relative to said housing;

wherein said spindle has an axial central bore for receiving a cable of a Bowden-cable arrangement, wherein the central bore ends in an interior space of said spindle for receiving a nipple attached to one end of said cable, said cross bore forming a passage for permitting insertion of said nipple into said interior space, said cross bore being connected with said central bore of said spindle by a slot for permitting passage of said cable.

* * * * *